United States Patent
Wu et al.

(10) Patent No.: US 8,171,725 B2
(45) Date of Patent: May 8, 2012

(54) METHOD OF CONTROLLING EXHAUST GAS PURIFICATION SYSTEM, AND EXHAUST GAS PURIFICATION SYSTEM

(75) Inventors: Wei Wu, Fujisawa (JP); Naofumi Ochi, Fujisawa (JP); Shigeru Ikeda, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 903 days.

(21) Appl. No.: 11/922,317

(22) PCT Filed: Jun. 20, 2006

(86) PCT No.: PCT/JP2006/312352
§ 371 (c)(1),
(2), (4) Date: Dec. 17, 2007

(87) PCT Pub. No.: WO2007/010701
PCT Pub. Date: Jan. 25, 2007

(65) Prior Publication Data
US 2009/0235644 A1    Sep. 24, 2009

(30) Foreign Application Priority Data
Jul. 15, 2005    (JP) ................................. 2005-206825

(51) Int. Cl.
*F01N 3/00*    (2006.01)
(52) U.S. Cl. ................ 60/295; 60/274; 60/285; 60/297; 60/311
(58) Field of Classification Search .................... 60/274, 60/276, 285, 295, 297, 311
See application file for complete search history.

(56) References Cited

U.S. PATENT DOCUMENTS

| | | | | |
|---|---|---|---|---|
| 4,719,751 A * | 1/1988 | Kume et al. | ..................... | 60/285 |
| 6,594,990 B2 * | 7/2003 | Kuenstler et al. | ............... | 60/295 |
| 6,817,174 B1 * | 11/2004 | Igarashi et al. | ................. | 60/295 |
| 6,952,918 B2 * | 10/2005 | Imai et al. | ....................... | 60/295 |
| 7,040,086 B2 * | 5/2006 | Kitahara et al. | ................ | 60/285 |

(Continued)

FOREIGN PATENT DOCUMENTS

JP    2003-3833    1/2003

(Continued)

OTHER PUBLICATIONS

International Search Report for PCT/JP2006/312352 completed Jul. 19, 2006 and mailed Aug. 1, 2006.

(Continued)

*Primary Examiner* — Thomas Denion
*Assistant Examiner* — Diem Tran
(74) *Attorney, Agent, or Firm* — Staas & Halsey LLP

(57) ABSTRACT

In an exhaust gas temperature raising control for recovering purification ability of an exhaust gas purification device of an internal combustion engine, the exhaust gas temperature is efficiently raised to a target level without producing white smoke. In recovery control of the exhaust gas purification device, when the temperature of the exhaust gas flowing into the exhaust gas purification device is lower than a predetermined judgment value, a first exhaust gas temperature raising control that does not include post injection but includes intake air restriction is performed, and when equal to or higher than the predetermined judgment value, a second exhaust gas temperature raising control that includes both the post injection and the intake air restriction is performed to set an intake air restriction amount in the first exhaust gas temperature raising control greater than an intake air restriction amount in the second exhaust gas temperature raising control.

4 Claims, 5 Drawing Sheets

U.S. PATENT DOCUMENTS

| | | | |
|---|---|---|---|
| 7,716,920 B2 * | 5/2010 | Onodera et al. | 60/295 |
| 7,788,909 B2 * | 9/2010 | Haseyama et al. | 60/286 |
| 2004/0226284 A1 | 11/2004 | Kitahara et al. | |
| 2005/0044845 A1 | 3/2005 | Onodera et al. | |

FOREIGN PATENT DOCUMENTS

| | | |
|---|---|---|
| JP | 2003-83139 | 3/2003 |
| JP | 2003-120353 | 4/2003 |
| JP | 2004-340032 | 12/2004 |
| JP | 2005-76604 | 3/2005 |

OTHER PUBLICATIONS

Patent Abstracts of Japan, Publication No. 2003-83139, Published Mar. 19, 2003.

* cited by examiner

METHOD OF CONTROLLING EXHAUST GAS PURIFICATION SYSTEM, AND EXHAUST GAS PURIFICATION SYSTEM

CROSS-REFERENCE TO RELATED APPLICATIONS

This application claims the benefit under 35 U.S.C. Section U.S.C. Section 371, of PCT International Application Number PCT/JP2006/312352, filed Jun. 20, 2006 and Japanese Application 2005-206825, filed Jul. 15, 2005 in Japan, the contents of which are incorporated herein by reference.

FIELD OF THE INVENTION

The present invention relates to a method of controlling an exhaust gas purification system and an exhaust gas purification system that perform a regeneration control including both an exhaust gas temperature raising control without post injection and an exhaust gas temperature raising control with post injection in order to recover the purification ability of an exhaust gas purifier to purify components in the exhaust gas of an internal combustion engine of a diesel engine, etc.

DESCRIPTION OF THE RELATED ART

Regulations on the exhaust amounts of particulate matter (PM: referred to as PM below) exhausted from diesel internal combustion engines as well as NOx, CO, and HC, etc. have been tightening every year. Technologies for reducing the amount of PM to be exhausted outside by collecting this PM with a filter called a diesel particulate filter (DPF: referred to as DPF below) have been developed. Among these, there are some DPF devices and some continuous regeneration type DPF devices carrying catalysts.

In these continuous regeneration type DPF devices, when the exhaust gas temperature is about 350° C. or more, PM collected by the DPF is continuously burnt and purified, and the DPF self-regenerates. However, in the case where the exhaust gas temperature is low, for example, in the case where a state of low exhaust gas temperature such as an idling operation, an operation at low load and low speed, etc. is continued, an oxidation reaction is not promoted because the exhaust gas temperature is low, the temperature of the catalyst is low, and the catalyst does not activate, and it then becomes difficult to regenerate a filter by oxidizing PM. Therefore, because accumulation of PM to the filter is continued and clogging of the filter is advanced, a problem of exhaust pressure rise is caused by the clogging of the filter.

As one of the techniques to solve such a problem, a regeneration control (referred to as PM regeneration control) is performed in which the collected PM is burned and removed forcibly by raising the exhaust gas temperature forcibly when clogging of the filter exceeds a predetermined amount. As the methods of detecting the clogging of this filter, for example, there is a method of detecting by a pressure difference between the upstream side and the downstream side of the filter, and a method of detecting by obtaining a PM accumulated amount by calculating the PM amount collected in an operation state of the engine from map data set in advance, etc.

Then, the exhaust gas temperature raising control is performed in this PM regeneration control. In this exhaust gas temperature raising control, in the case where the exhaust gas temperature is lower than the active temperature of an oxidation catalyst provided upstream of the filter or an oxidation catalyst carried by the filter, the temperature of the exhaust gas flowing into the filter is raised to the temperature at which the PM collected by the filter burns or more by performing the exhaust gas temperature raising control. Thereby, the filter is regenerated by raising the filter temperature and by burning and removing PM.

As the exhaust gas temperature raising control, there is a method of performing a multiple injection (multiple-stage delayed injection) and a post injection (after-injection) as in-cylinder fuel injections. This multiple injection is a multiple-stage delayed injection performed to raise the exhaust gas temperature to the active temperature of the oxidation catalyst or more. Furthermore, the post injection is performed to increase HC in the exhaust gas, the HC burns with the oxidation catalyst, and the exhaust gas temperature downstream of the oxidation catalyst becomes high. That is, in in-cylinder injection, after the main injection, an auxiliary injection is performed at a timing of later than a normal burning, that is, a timing delayed so that the burning is continued.

Related to this exhaust gas temperature raising control, for example, an exhaust gas temperature raising device of an internal combustion engine as described in Japanese patent application Kokai publication No. 2003-83139 has been proposed. In this device, the thermal capacity is increased by appropriately throttling an intake air flow amount concurrently when an exhaust gas temperature is raised by a post injection for regeneration of the catalyst regeneration type DPF and thereby reducing the flow amount of the exhaust gas. Along with this, the exhaust gas temperature is raised by performing a pilot injection prior to the main injection and a post injection following the main injection to inject fuel at a little later timing than a compression top dead center. In this raising temperature of the exhaust gas, air-intake throttling is used together to enhance raising temperature.

Because white smoke is exhausted when this post injection is performed at a low exhaust gas temperature, for example, at 250° C. or less, the post injection is controlled to be performed after the temperature is raised to a certain level by performing the multiple injection. However, in order to perform regeneration of the exhaust gas purifier efficiently by raising the exhaust gas temperature as quickly as possible, it is necessary to raise the exhaust gas temperature as quickly as possible even when the exhaust gas temperature is low such that the post injection cannot be performed due to production of the white smoke.

SUMMARY OF THE INVENTION

The objective of the present invention is to provide a method of controlling an exhaust gas purification system and an exhaust gas purification system which are provided with an exhaust gas purifier to purify components in an exhaust gas of an internal combustion engine of a diesel engine, etc., and which are capable of raising the exhaust gas temperature efficiently while preventing production of white smoke in an exhaust gas temperature raising control for recovering the purification ability of this exhaust gas purifier.

In an exhaust gas purification system including an exhaust gas purifier to purify components in an exhaust gas and a regeneration control means performing a regeneration control accompanied by a post injection in an in-cylinder fuel injection control to recover the purification ability of the exhaust gas purifier in an exhaust gas passage of an internal combustion engine, a method of controlling the exhaust gas purification system in the present invention to achieve the above-described objectives is characterized in that in an exhaust gas temperature raising control at the regeneration control, a first exhaust gas temperature raising control performing a control including air-intake throttling without post injection is performed in the case where a temperature of the exhaust gas flowing into the exhaust gas purifier is lower than a predetermined determination value and a second exhaust gas temperature raising control performing a control including the post injection and the air-intake throttling is performed in the case where the temperature of the exhaust gas flowing into the exhaust gas purifier is the predetermined determination value or more, so that the air-intake throttle amount in the case of the first exhaust gas temperature raising control becomes larger than the air-intake throttle amount in the case of the second exhaust gas temperature raising control.

In the present invention, in the case of performing an exhaust gas temperature raising control in which a post injection is performed together with an air-intake throttling, when an exhaust gas temperature is lower than a predetermined determination value such that white smoke is easily produced, air-intake throttling is increased to enhance raising the temperature of the exhaust gas while avoiding the production of white smoke without performing the post injection. Furthermore, in the case where the exhaust gas temperature is higher than the predetermined determination value and the post injection can be performed without worrying about the production of white smoke, a-control to make the air-intake throttling shallow is performed while performing the post injection. Hereby, an oxygen amount in the exhaust gas is increased, reaction performance of an oxidation catalyst is improved, and controllability of PM combustion temperature can be improved.

With this control, the exhaust gas temperature raising control with/without the post injection depending on the temperature of the exhaust gas flowing into the exhaust gas purifier is performed. Then, depending on this with/without the post injection, a control to change the air-intake throttle amount, in other words, a control to change the valve opening of an air-intake throttle valve is performed. Hereby, the temperature of the exhaust gas purifier can be raised to an objective temperature by quickly raising the exhaust gas temperature while preventing the production of white smoke, and a regeneration control can be performed efficiently.

The exhaust gas purifier of the above-described exhaust gas purification system may be a NOx purification catalyst such as a NOx occlusion reduction type catalyst other than the continuous regeneration type diesel particulate filter device (continuous regeneration type DPF device) as long as it is an exhaust gas device to recover exhaust gas purification ability by using a post injection.

Moreover, in the case of forming the exhaust gas purifier with the continuous regeneration type DPF device, the purification ability of the exhaust gas purifier that is an ability to collect PM is recovered by raising the temperature of the filter to the temperature where PM (particulate matter) collected in the filter burns and thereby burning to remove PM such as by raising the exhaust gas temperature and oxidizing the exhaust gas with an oxidation catalyst.

The present invention can apply to the exhaust gas purification system if it includes the exhaust gas purifier to purify components in the exhaust gas in the exhaust gas passage of the internal combustion engine and the regeneration control means performing the regeneration control accompanied with the post injection in the in-cylinder fuel injection control to recover the purification ability of this exhaust gas purifier as described above.

Furthermore, an exhaust gas purification system in the present invention to achieve the above-described objectives including an exhaust gas purifier to purify components in an exhaust gas and a regeneration control means performing a regeneration control accompanied with a post injection in an in-cylinder fuel injection control to recover the purification ability of the exhaust gas purifier in an exhaust gas passage of an internal combustion engine, the exhaust gas purification system is configured such that in an exhaust gas temperature raising control at the regeneration control, the regeneration control means performs a first exhaust gas temperature raising control performing a control including air-intake throttling without including the post injection in the case where a temperature of the exhaust gas flowing into the exhaust gas purifier is lower than a predetermined determination value and performs a second exhaust gas temperature raising control performing a control including the post injection and the air-intake throttling in the case where the temperature of the exhaust gas flowing into the exhaust gas purifier is the predetermined determination value or more, so that an air-intake throttle amount in the case of the first exhaust gas temperature raising control becomes larger than an air-intake throttle amount in the case of the second exhaust gas temperature raising control.

In this configuration, in the exhaust gas temperature raising control, a control to change the air-intake throttle amount depending on whether there is a post injection or not, in other words, a control to change the valve opening of an air-intake throttle valve is performed. Hereby, the temperature of the exhaust gas purifier can be raised to an objective temperature by quickly raising the exhaust gas temperature, and a regeneration control can be performed efficiently.

Furthermore, in the above-described exhaust gas purification system, the above-described continuous regeneration type diesel particulate filter device can be formed with any one of a continuous regeneration type diesel particulate filter device in which an oxidation catalyst is carried on a filter, a continuous regeneration type diesel particulate filter device provided with a filter and an oxidation catalyst on the upstream side of the filter, and a continuous regeneration type diesel particulate filter device provided with a filter with catalyst and an oxidation catalyst on the upstream side of the filter, or with a combination of these devices.

With these configurations, an exhaust gas purification system that can carry out the above-described method of controlling the exhaust gas purification system can be provided, and the same operation effects can be achieved.

According to the method of controlling the exhaust gas purification system and the exhaust gas purification system in the present invention, in the exhaust gas purification system provided with an exhaust gas purifier to purify components in an exhaust gas of an internal combustion engine such as a diesel engine, in an exhaust gas temperature raising control of a regeneration control to recover the purification ability of the exhaust gas purifier, an exhaust gas temperature is quickly raised by performing a post injection with a deep air-intake throttling without performing the post injection so that white smoke is not produced by the post injection when the exhaust gas temperature is low and by performing the post injection with a shallow air-intake throttling because white smoke is not produced by the post injection when the exhaust gas temperature is high. Hereby, a stable temperature control can be performed, and the regeneration control of the exhaust gas purifier can be performed efficiently.

That is, when the exhaust gas temperature is low so that the post injection cannot be performed, the exhaust gas temperature is raised quickly because the intake air is throttled further than when the post injection is possible, and a recovery processing of the purification ability of the exhaust gas purifier can be performed efficiently.

DESCRIPTION OF EMBODIMENTS

Figure 1:
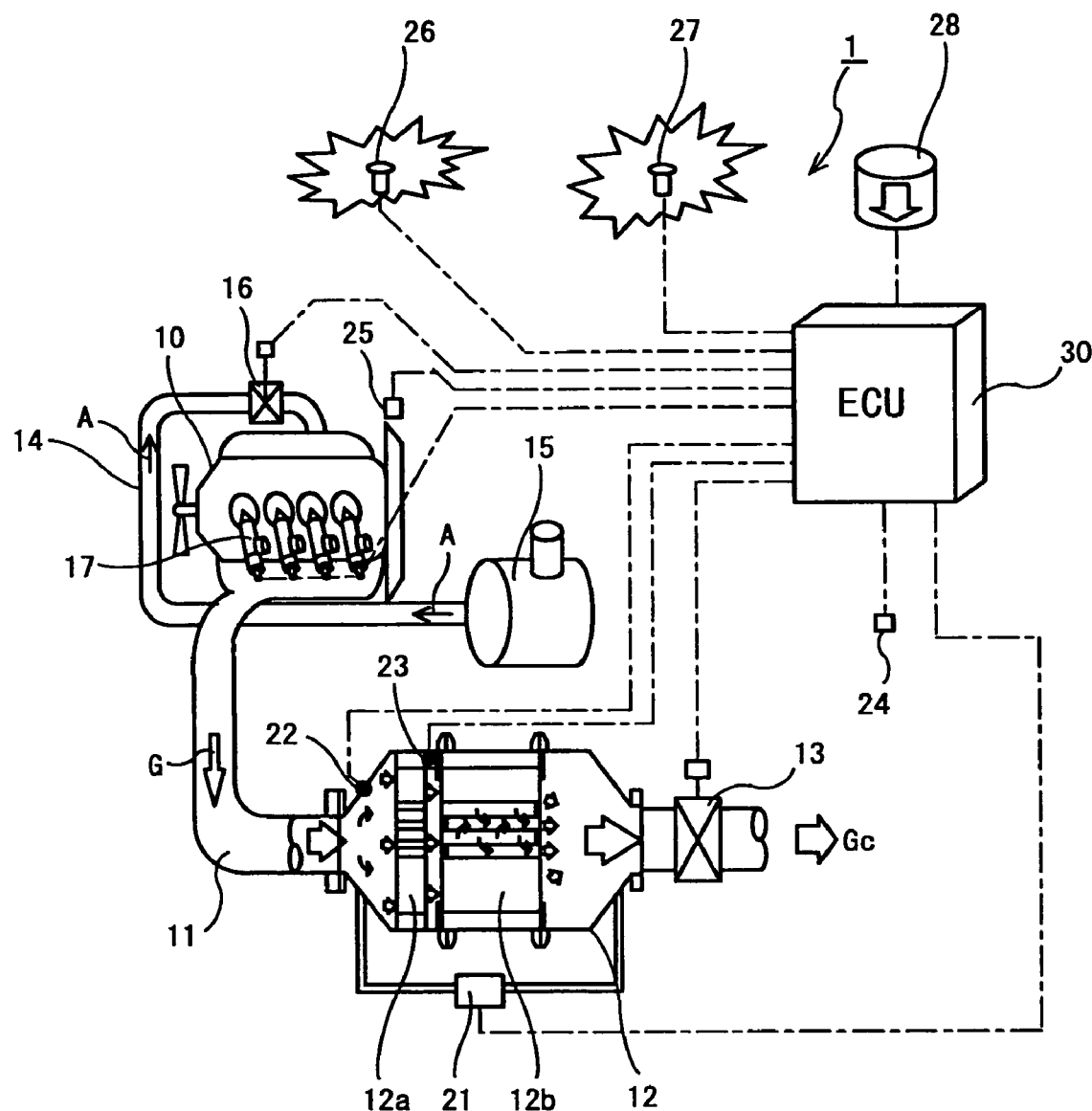
FIG. 1 is a system configuration diagram of an exhaust gas purification system of an embodiment according to the present invention.

Below, the method of controlling the exhaust gas purification system and the exhaust gas purification system of the embodiments according to the present invention are explained with the exhaust gas purification system provided with a continuous regeneration type DPF device configured with a combination of an oxidation catalyst and a filter with catalyst as an example and by referring to the drawings.

The configuration of an exhaust gas purification system 1 of this embodiment is shown in FIG. 1. This exhaust gas purification system 1 is configured to provide a continuous regeneration type DPF device 12 in an exhaust gas passage 11 of a diesel engine (an internal combustion engine) 10. This continuous regeneration type DPF device 12 is configured to have an oxidation catalyst 12a on the upstream side and a filter with catalyst 12b on the downstream side. Furthermore, an exhaust gas throttle valve (an exhaust gas throttle) 13 is provided on the downstream side of this continuous regeneration type DPF device 12.

The oxidation catalyst 12a is formed by having oxidation catalyst such as platinum (Pt) carried by a carrier with such as a honeycomb structure of porous ceramics. The filter with catalyst 12b is formed of a filter of a monolithic honeycomb wall-flow type in which inlets and outlets of channels of porous ceramics honeycomb are plugged alternately, a felt-state filter in which inorganic fibers such as alumina are randomly laminated, etc. Catalyst such as platinum and cerium oxide is carried by this filter part.

Then, in the case of employing a monolithic honeycomb type wall flow type filter on the filter with catalyst 12b, PM (particulate matter) that is a component in exhaust gas G is collected (trapped) with the porous ceramic wall, and in the case of employing a fiber type filter, PM is collected with the inorganic fibers of the filter.

Then, in order to estimate the accumulation amount of PM of the filter with catalyst 12b, a differential pressure sensor 21 is provided at a conduit pipe connected on the upstream side and the downstream side of the continuous regeneration type DPF device 12. Furthermore, an oxidation catalyst inlet exhaust gas temperature sensor 22 is provided on the upstream side of the oxidation catalyst 12a for a regeneration control of the filter with catalyst 12b, and a filter inlet exhaust gas temperature sensor 23 is provided between the oxidation catalyst 12a and the filter with catalyst 12b.

The output values of these sensors are input to a control device (ECU: Engine Control Unit) 30 performing overall control of the operation of the engine 10 and also performing a regeneration control of the continuous regeneration type DPF device 12. An air-intake throttle valve 16, a fuel injection device (injection nozzle) 17 of the engine 10, and an EGR valve (not shown), etc. are controlled with a control signal output from this control device 30. The air-intake throttle valve 16 is provided in an intake air passage 14 and adjusts the amount of intake air A flowing into an intake air manifold through an air cleaner 15. The fuel injection device 17 is connected to a common rail injection system (not shown) that temporarily stores a high-pressured fuel of which the pressure is increased with a fuel pump (not shown). The EGR valve is provided in an EGR passage (not shown) together with an EGR cooler (not shown) and adjusts the EGR amount.

Information such as the speed of a vehicle and a coolant temperature is input to the control device 30 as well as information such as the accelerator opening from an accelerator position sensor (APS) 24 and the engine speed from a speed sensor 25 for the operation of the engine. A current supply time signal is output from the control device 30 so that a predetermined amount of fuel is injected from the fuel injection device 17.

Furthermore, in the regeneration control of this continuous regeneration type DPF device 12, a flasher (a DPF lamp) 26 to draw a caution, a warning lamp 27, and a regeneration button (a manual regeneration switch) 28 are provided not only to perform a forced regeneration automatically while the vehicle is running, but also to draw a driver's attention so that the driver can arbitrarily stop the vehicle and can perform the forced regeneration, when the collection amount of PM in the filter with the catalyst 12b exceeds a certain amount and the filter with catalyst 12b is clogged up.

Figure 2:
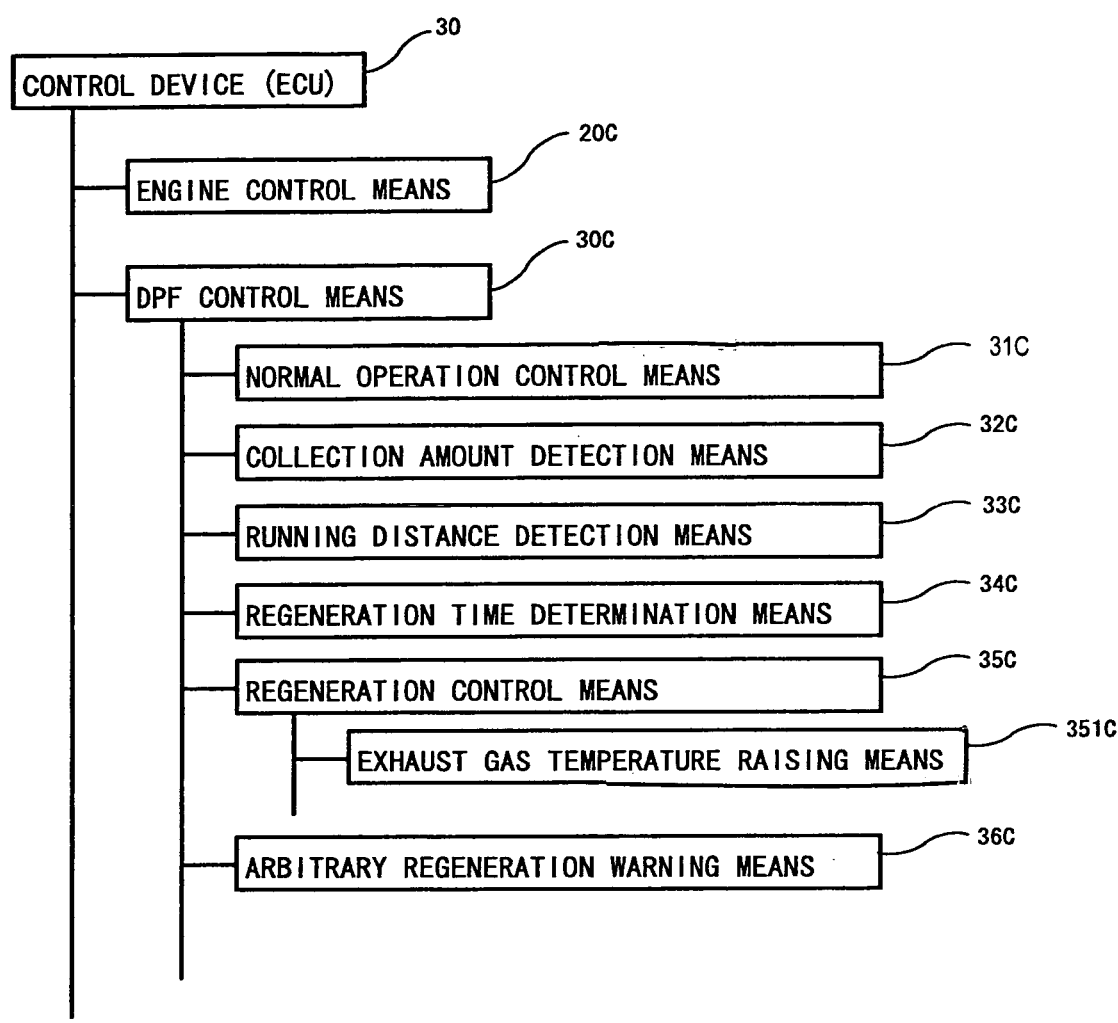
FIG. 2 is a diagram showing a configuration of a control means of the exhaust gas purification system of the embodiment according to the present invention.

Furthermore, the control device 30 is configured to have an engine control means 20C controlling the operation of the engine 10, a diesel particulate filter (DPF) control means 30C for the exhaust gas purification system 1, etc. as shown in FIG. 2. Then, the DPF control means 30C is configured to have a normal operation control means 31C, a collection amount detection means 32C, a running distance detection means 33C, a regeneration time determination means 34C, a regeneration control means 35C, an arbitrary regeneration warning means 36C, etc.

The normal operation control means 31C is, in particular, a means for performing a normal operation that is performed without any relation to the regeneration of the continuous regeneration type DPF device 12. This means 31C performs a normal injection control in which a predetermined amount of the fuel is injected from the fuel injection device 17 into cylinders by the current supply time signal calculated in the control device 30 based on the signal of the accelerator position sensor 24 and the signal of the speed sensor 25. That is, this means 31C is a means that does not especially perform a control for the regeneration control.

The collection amount detection means 32C is a means to detect the collection amount of PM collected in the filter with catalyst 12b in the continuous regeneration type DPF device 12. In this embodiment, the collection amount of PM is detected using a pressure difference between the upstream side and the downstream side of the continuous regeneration type DPF device 12, that is, a measured value $\Delta Pm$ by the differential pressure sensor 21.

The running distance detection means 33C is a means to detect a distance $\Delta Mc$ that the vehicle has run after the DPF regeneration. In the case where the forced regeneration has been performed, this running distance $\Delta Mc$ is reset at an appropriate time in a period from start of regeneration to end of the regeneration.

The regeneration time determination means 34C is a means to determine the time to start the regeneration of the DPF by comparing each of the differential pressure detection value ΔPm and the running distance ΔMc detected by the running distance detection means 33C with a predetermined determination value.

The regeneration control means 35C is configured to have an exhaust gas temperature raising means 351C although the control differs a little depending on the types of the continuous regeneration type DPF device 12. This exhaust gas temperature raising means 351C is a means to raise the exhaust gas temperature Tg1 to the active temperature of the oxidation catalyst 12a in the case where the exhaust gas temperature Tg1 detected with the oxidation catalyst inlet exhaust gas temperature sensor 22 is lower than a predetermined first determination temperature Tc.

In the present invention, in this exhaust gas temperature raising control, a first exhaust gas temperature raising control is performed in the case where the temperature Tg1 of the exhaust gas flowing into the continuous regeneration type DPF device 12 is lower than the predetermined first determination temperature Tc (the predetermined determination value). In this first exhaust temperature raising control, a multiple injection (multiple-stage delayed injection), an air-intake throttling, and an exhaust gas throttling are performed without performing the post injection. Furthermore, a second exhaust gas temperature raising control is performed in the case where the exhaust gas temperature Tg1 is higher than the predetermined first determination temperature Tc. In this second exhaust gas temperature raising control, the air-intake throttling and the exhaust gas throttling are performed together with performing the post injection (the after-injection) in addition to the multiple injection in in-cylinder (in-tube) injection of the engine 10.

Then, an air-intake throttle amount α in the first exhaust gas temperature raising control in which the post injection is not performed is made to be larger than an air-intake throttle amount β in the second exhaust gas temperature raising control in which the post injection is performed. That is, it is made to be a deeper air-intake throttling in the first exhaust gas temperature raising control. Moreover, there is a case of using an EGR control together in this exhaust gas temperature raising control.

In this configuration, a control to change the air-intake throttle amount depending on whether there is a post injection amount or not, that is, a control to change the ratio of an opening of the air-intake throttle valve 16 to a full opening of the air-intake throttle valve 16, is performed. Hereby, the temperature of the oxidation catalyst 12a is raised by quickly raising the exhaust gas temperature while preventing white smoke from being produced. Together with this, the amount of intake oxygen is increased through decreasing the air-intake throttling. As a result, fuel oxidation reactivity of the oxidation catalyst is improved, and the regeneration control can be performed efficiently. That is, the temperature is raised quickly in the exhaust gas temperature raising control because when the exhaust gas temperature is low in which the post injection cannot be performed, the intake air is throttled further than when the post injection is possible in the first exhaust gas temperature raising control.

The arbitrary regeneration warning means 36C is configured with the flasher (a DPF lamp) 26, the warning lamp 27, etc. This means 36C is a means to perform a warning to urge a driver to operate the regeneration control means 35C manually with flashing of the flasher 26 and to urge the driver to bring the vehicle to a service center with lighting of the warning lamp 27. Moreover, the driver who received this warning can start the regeneration control by the regeneration control means 35C by operating the manual regeneration button (manual regeneration switch) 28.

Then, the DPF control means 30C having these various means is configured as a means to continue normal operation by the normal operation control means 31C, to perform a warning to urge a driver to manually operate the regeneration control means 35C, and to make the regeneration control means 35C operate automatically based on the differential pressure ΔPm between the upstream side and the downstream side of the DPF detected by the collection amount detection means 32C and the running distance ΔMc after the DPF regeneration detected by the running distance detection means 33C.

Next, the DPF control of this exhaust gas purification system 1 is explained. In the control of this exhaust gas purification system 1, a normal operation is performed by the normal operation control means 31C, and PM is collected. In this normal operation, whether it is a regeneration time or not is observed by the regeneration time determination means 34C, and when it is determined that it is the regeneration time, a warning by the arbitrary regeneration warning means 36C is performed or a running automatic regeneration is performed by the regeneration control means 35C.

That is, the necessity of the arbitrary regeneration or the necessity of the running automatic regeneration is determined depending on whether the differential pressure ΔPm between the upstream side and the downstream side of the DPF detected by the collection amount detection means 32C and the running distance ΔMc detected by the running distance detection means 33C are in a predetermined range or not. As a result of this determination, depending on the necessity, by returning after various processes are performed, a normal operation is performed by the normal operation control means 31C. Then, the operation of the vehicle is performed while repeating the normal operation and the DPF control.

Figure 4:
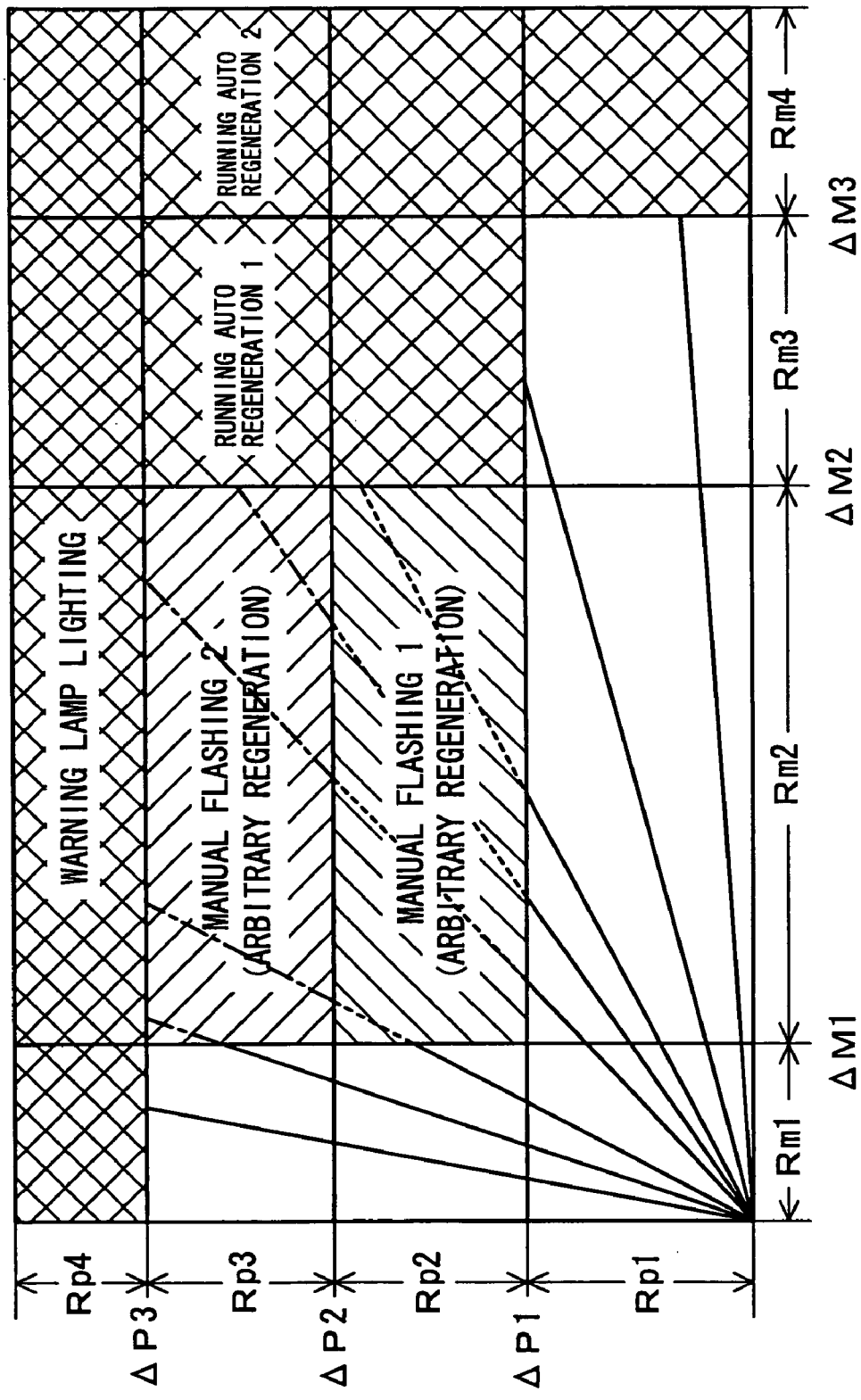
FIG. 4 is a graph schematically showing a map for DPF control of the exhaust gas purification system.
Figure 5:
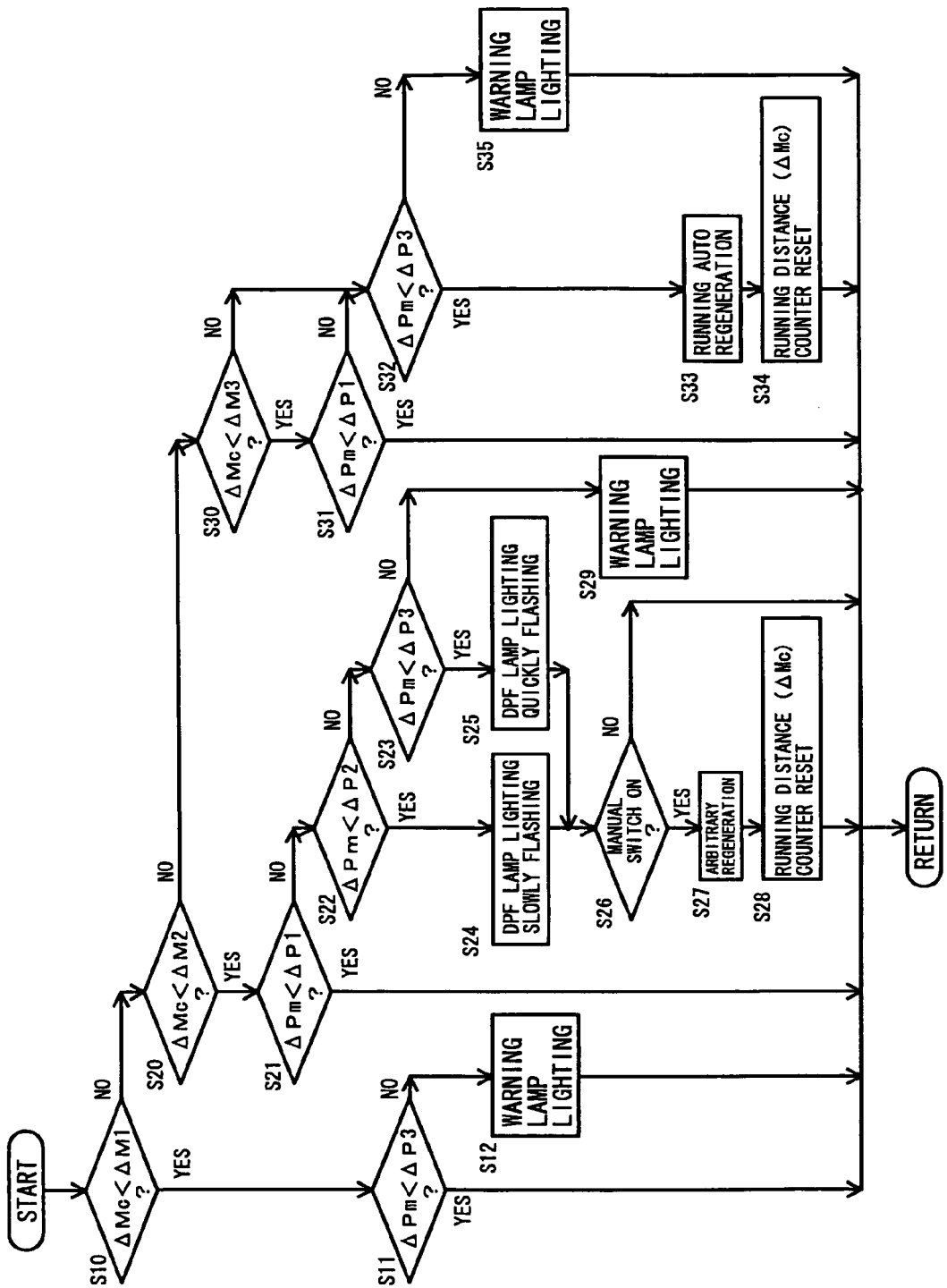
FIG. 5 is a flow diagram showing one example of DPF control of the exhaust gas purification system.

This DPF control is explained by referring to the map for the DPF control shown in FIG. 4. Moreover, this DPF control can be carried out with the DPF control flow as exemplified in FIG. 5.

First, when the running distance ΔMc is at a smaller region Rm1 than a first threshold ΔM1, if a forced regeneration is performed, the execution of the regeneration control is inhibited to avoid a problem of oil dilution etc. because evaporation of the fuel in oil is insufficient.

Next, in the case where the running distance ΔMc is in a predetermined range Rm2 that is between the first threshold ΔM1 and a second threshold ΔM2, the flasher (DPF lamp) 26 is slowly flashed when the detected differential pressure ΔPm between the upstream side and the downstream side of the DPF exceeds the first threshold ΔP1 (a manual flash 1) in order that the arbitrary regeneration (manual regeneration) performing the forced regeneration by stopping the vehicle and pushing the manual regeneration bottom 28 is urged without performing the automatic forced regeneration because the running is yet insufficient and the evaporation of the fuel mixed into the engine oil is not performed sufficiently. Furthermore, the flasher 26 is flashed quickly when the detected differential pressure ΔPm between the upstream side and the downstream side of the DPF exceeds the second threshold ΔP2 (a manual flash 2) larger than the first threshold ΔP1. Hereby, the forced regeneration with manual operation by stopping the vehicle is strongly urged to a driver.

Then, in the case where the running distance ΔMc is in a predetermined range Rm3 that is between the second threshold ΔM2 and a third threshold ΔM3, the regeneration control is performed automatically when the detected differential pressure ΔPm between the upstream side and the downstream side of the DPF exceeds the first threshold ΔP1 (a running automatic regeneration 1) because the evaporation of the fuel mixed into the engine oil is performed sufficiently and the automatic forced regeneration during running (running automatic regeneration) is possible. With this running automatic regeneration, a burden related to the forced regeneration with manual, that is, a burden related to an on/off operation of the manual regeneration bottom 28 on the driver is reduced.

Furthermore, in the case where the running distance ΔMc is in a predetermined range Rm4 that exceeds the third threshold ΔM3 (a running automatic regeneration 2), the regeneration control is performed automatically to prevent thermal runaway caused by uneven accumulation of PM in the filter with catalyst 12b and melting damage of the DPF, without relating to the detected differential pressure ΔPm between the upstream side and the downstream side of the DPF.

Figure 3:
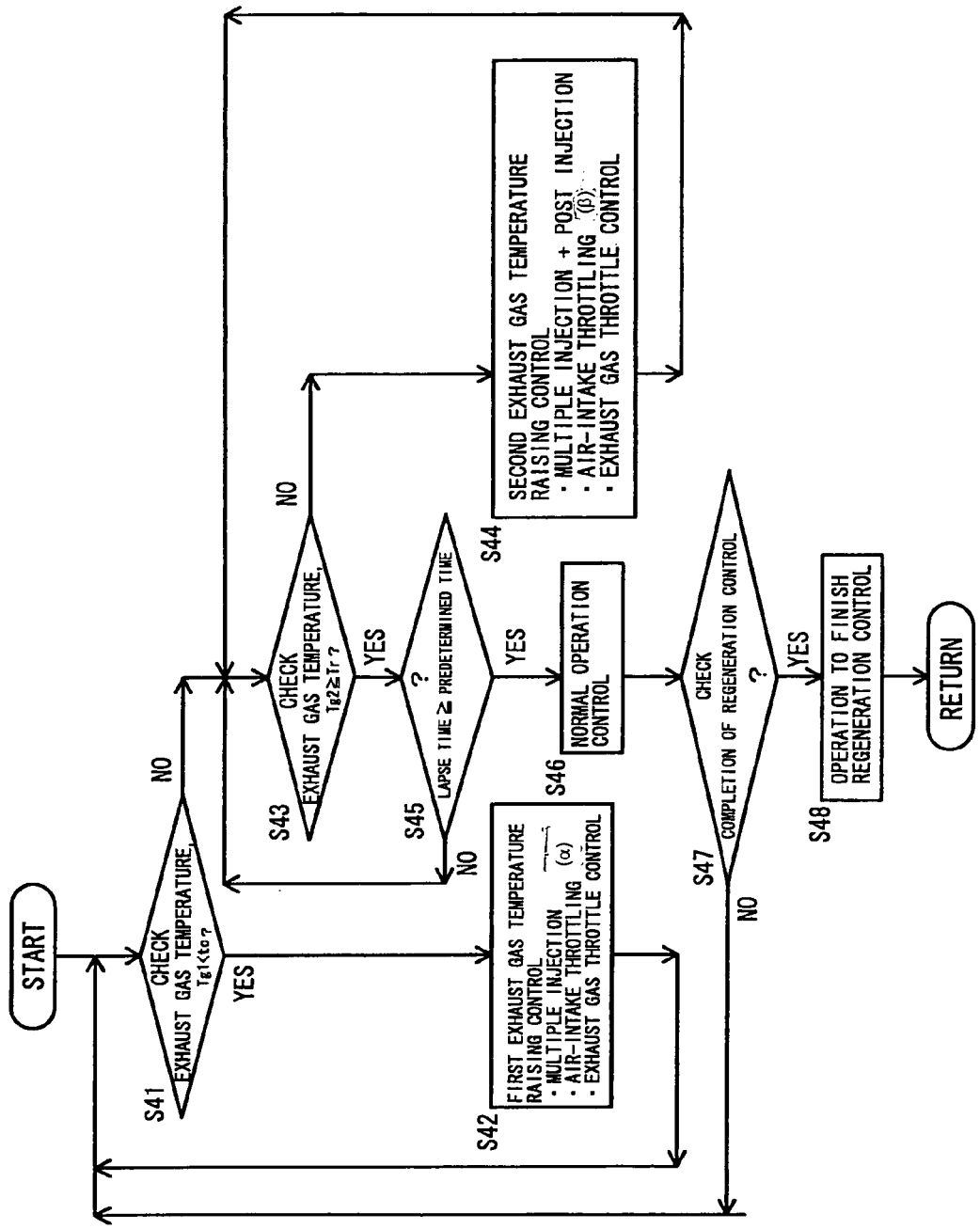
FIG. 3 is a flow diagram showing one example of a regeneration control of a continuous regeneration type DPF device for PM purification.

In these regeneration controls, as shown in FIG. 3, in the case where the exhaust gas temperature Tg1 is lower than the predetermined first determination temperature Tc related to an activation temperature of the oxidation catalyst 12a by checking the temperature Tg1 of the exhaust gas flowing into the oxidation catalyst 12a in a step S41, that is, in the case of determining that the catalyst temperature of the oxidation catalyst 12a has not reached the activation temperature, the first exhaust gas temperature raising control is performed for a predetermined time (a time related to the interval of checking the exhaust gas temperature in the step S41) in a step S42, and the program returns to the step S41. In the first exhaust gas temperature raising control in this step S42, a multiple injection control, the air-intake throttle control of the air-intake throttle amount α, and the exhaust gas throttle control are performed without performing the post injection.

Then, in the case where the exhaust gas temperature Tg1 exceeds the predetermined first determination temperature Tc in the determination of the step S41, that is, in the case of determining that the catalyst temperature of the oxidation catalyst 12a has reached the activation temperature, whether the temperature Tg2 of the exhaust gas flowing into the filter with catalyst 12b is a predetermined second determination temperature Tr or more or not is determined in a step S43.

In the case where the exhaust gas temperature Tg2 is not the predetermined second determination temperature Tr or more in the determination of this step S43, the second exhaust gas temperature raising control is performed for a predetermined time (a time related to an interval of checking the exhaust gas temperature in the step S43) in a step S44, and the program returns to the step S43. In this second exhaust gas temperature raising control, the air-intake throttle control of the air-intake throttle amount β and the exhaust gas throttle control are performed together with performing the post injection in addition to the multiple injection.

In the present invention, in the exhaust gas temperature raising control, the air-intake throttle amount α in the case of the first exhaust gas temperature raising control in which the post injection is not performed is made to be larger than the air-intake throttle amount β in the case of the second exhaust gas temperature raising control in which the post injection is performed. That is, α>β. Moreover, there is a case of using an EGR control together in these exhaust gas temperature raising controls.

In these exhaust gas temperature raising controls, the air-intake throttle amount is changed depending on whether there is a post injection amount or not. That is, the exhaust gas temperature is raised while avoiding the production of white smoke with a deep air-intake throttling (α) without performing the post injection in the first exhaust gas temperature raising control when the temperature is low in which white smoke is produced (Tg1<Tc). Furthermore, in the second exhaust gas temperature raising control when the temperature is high in which white smoke is not produced (Tg1≧Tc), the post injection is performed with a shallow air-intake throttling (β), and an amount of intake oxygen is increased by decreasing the air-intake throttle amount. Hereby, the post injection fuel is oxidized efficiently with the oxidation catalyst, and the temperature raising performance and the temperature controlling performance of the catalyst are improved. With these exhaust gas temperature raising controls, the exhaust gas temperature is raised quickly, the temperature of the exhaust gas purifier 12 is raised, and the regeneration control is performed efficiently.

In the case where the exhaust gas temperature Tg2 is the predetermined second determination temperature Tr or more in the determination of this step S43, the program proceeds to a step S45 considering that PM has already reached to a temperature at which combustion is started. In the step S45, whether the lapse time that the exhaust gas temperature Tg2 is the predetermined second determination temperature Tr or more is a predetermined time or more or not is determined. If the lapse time is not the predetermined time or more in this determination, the program returns to the step S43, and if the lapse time is the predetermined time or more, the program proceeds to a step S46.

In the step S46, the normal operation control is performed for a predetermined time (a time related to an interval of checking the completion of the regeneration control), and the program proceeds to a step S47. The exhaust gas temperature raising control is not especially performed in this normal operation control. That is, when the combustion of PM is started once by increasing the temperature of the filter with catalyst 12b by the exhaust gas temperature raising control, the combustion is continued by the combustion heat of PM. Therefore, the exhaust gas temperature raising control becomes unnecessary, and the program returns to the normal operation control.

The determination whether the regeneration control is completed or not is performed in the step S47. This determination can be performed whether the lapse time that the temperature Tg2 of the exhaust gas flowing into the filter with catalyst 12b is the predetermined second determination temperature Tr or more exceeds the regeneration time that is set in advance or not, or whether the differential pressure between the upstream side and the downstream side of the filter is a predetermined value or less or not.

In the case where the regeneration control is not completed in the determination of the step S47, the program returns to the step S41 and exhaust is repeated until the regeneration control completes. Then, the exhaust gas temperature Tg1 and the exhaust gas temperature Tg2 are observed in the step S41 and the step S43. When these temperatures are decreased, the exhaust gas temperature raising control is restarted. Moreover, the combustion state of PM may be configured to restart the temperature raising control if needed while monitoring the oxygen concentration and the exhaust gas temperature on the downstream side of the continuous regeneration type DPF device 12.

In the case where the regeneration control is completed in the determination of the step S47, an operation to finish the regeneration control of a step S48 is performed and the program returns. In this operation to finish the regeneration control, finishing of the multiple injection and the post injection controls, finishing of the DPF regeneration control of the air-intake throttling, and finishing of the DPF regeneration control of the exhaust gas throttling are performed. Furthermore, a regeneration control flag may be reset in order to memorize that the regeneration control is finished if needed.

Moreover, when the detected differential pressure ΔPm between the upstream side and the downstream side of the DPF exceeds a third threshold ΔP3 (enters a region Rp4 (flashing of the warning lamp)) not related with the running distance ΔMc, the warning lamp 27 is lighted to urge a driver to bring the vehicle to a service center together with making a state in which the arbitrary regeneration and the running automatic regeneration are inhibited in order to avoid the thermal runaway that is a rapid combustion of PM.

Therefore, according to the above-described method of controlling the exhaust gas purification system and an above-described exhaust gas purification system 1, the first exhaust gas temperature raising control is performed with a deep air-intake throttling (α) without performing the post injection so that white smoke is not produced in the post injection when the exhaust gas temperature is low. Furthermore, the second exhaust gas temperature raising control in which the post injection is performed with a shallow air-intake throttling (β) is performed because white smoke is not produced in the post injection when the exhaust gas temperature is high. By these controls, raising the temperature of the exhaust gas is performed quickly. Therefore, raising temperature and the regeneration of the continuous regeneration type DPF device 12 can be performed efficiently while preventing the production of white smoke by the post injection in the exhaust gas temperature raising control in the regeneration control.

Moreover, a device provided with the oxidation catalyst on the upstream side of the filter together with making the filter carry the catalyst is explained as an example of the continuous regeneration type DPF device in the exhaust gas purification system in the above-described explanation. The present invention is not limited to this and is applicable to the continuous regeneration type DPF device of other types such as a continuous regeneration type DPF device in which the catalyst is carried on the filter and a continuous regeneration type DPF device provided with the oxidation catalyst on the upstream side of the filter.

Furthermore, the present invention is applicable in the regeneration control at the recovery of NOx purification ability of a NOx purification catalyst such as a NOx occlusion reduction type catalyst and a NOx direct reduction type catalyst. Furthermore, the present invention is applicable in a sulfur purge, etc. to recover from a sulfur poisoning in the case where the exhaust gas purifier is carrying an oxidation catalyst, a NOx occlusion reduction type catalyst, a NOx direct reduction type catalyst, a SCR catalyst (selective reduction type catalyst), etc.

In the method of controlling the exhaust gas purification system and the exhaust gas purification system having the above-described superior effects according to the present invention, the exhaust gas temperature can be raised efficiently while preventing the production of white smoke at the exhaust gas temperature raising control to recover the purification ability of the exhaust gas purifier to purify components in the exhaust gas of an internal combustion engine such as a diesel engine. Therefore, they can be utilized extremely efficiently as a method of controlling an exhaust gas purification system and an exhaust gas purification system in an internal combustion engine mounted on an automobile.

What is claimed is:

1. A control method of an exhaust gas purification system provided with an exhaust gas purifier having an oxidation catalyst to purify components in an exhaust gas and a regeneration controller performing a regeneration control accompanied by a post injection in an in-cylinder fuel injection control to recover a purification ability of the exhaust gas purifier in an exhaust gas passage of an internal combustion engine, wherein in an exhaust gas temperature raising control at the regeneration control, performing a first exhaust gas temperature raising control using a multiple-stage delayed injection, an air-intake throttling and an exhaust gas throttling without performing a post injection, when a temperature of the exhaust gas flowing into the exhaust gas purifier is lower than a predetermined value corresponding to an activation temperature of the oxidation catalyst, and performing a second exhaust gas temperature raising control using the post injection, the air-intake throttling, and the exhaust gas throttling in addition to the multiple-stage delayed injection, when the temperature of the exhaust gas flowing into the exhaust gas purifier is equal to or more than the predetermined value, so that an air-intake throttle amount for the first exhaust gas temperature raising control becomes larger than an air-intake throttle amount for the second exhaust gas temperature raising control.

2. The control method of the exhaust gas purification system according to claim 1, wherein the exhaust gas purifier is any one of a continuous regeneration type diesel particulate filter device in which the oxidation catalyst is carried on a filter, a continuous regeneration type diesel particulate filter device provided with a filter and the oxidation catalyst on an upstream side of the filter, or a continuous regeneration type diesel particulate filter device provided with a filter with a catalyst and the oxidation catalyst on the upstream side of the filter, or a combination of these devices.

3. An exhaust gas purification system comprising:

an exhaust gas purifier having an oxidation catalyst to purify components in an exhaust gas; and a regeneration controller performing a regeneration control accompanied by a post injection in an in-cylinder fuel injection control to recover a purification ability of the exhaust gas purifier in an exhaust gas passage of an internal combustion engine, wherein in an exhaust gas temperature raising control at the regeneration control, the regeneration controller performs a first exhaust gas temperature raising control using a multiple-stage delayed injection, an air-intake throttling and an exhaust gas throttling without performing post injection, when a temperature of the exhaust gas flowing into the exhaust gas purifier is lower than a predetermined value corresponding to an activation temperature of the oxidation catalyst, and performs a second exhaust gas temperature raising control using the post injection, the air-intake throttling, and the exhaust gas throttling in addition to the multiple stage delayed injection, when the temperature of the exhaust gas flowing into the exhaust gas purifier is equal to a greater than the predetermined value, so that an air-intake throttle amount for the first exhaust gas temperature raising control becomes larger than an air-intake throttle amount for the second exhaust gas temperature raising control.

4. The exhaust gas purification system according to claim 3, wherein the exhaust gas purifier is formed with any one of a continuous regeneration type diesel particulate filter device in which the oxidation catalyst is carried on a filter, a continuous regeneration type diesel particulate filter device provided with a filter and the oxidation catalyst on an upstream side of the filter, or a continuous regeneration type diesel particulate filter device provided with a filter with catalyst and the oxidation catalyst on the upstream side of the filter, or a combination of these devices.

* * * * *